United States Patent
Lim et al.

(10) Patent No.: US 11,381,910 B2
(45) Date of Patent: Jul. 5, 2022

(54) METHOD FOR REMOVING DUST USING SPEAKER AND ELECTRONIC DEVICE SUPPORTING THE SAME

(71) Applicant: SAMSUNG ELECTRONICS CO., LTD., Suwon-si (KR)

(72) Inventors: Wonsub Lim, Suwon-si (KR); Doil Ku, Suwon-si (KR); Sangsoon Kim, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 16/837,130

(22) Filed: Apr. 1, 2020

(65) Prior Publication Data
US 2020/0322724 A1    Oct. 8, 2020

(30) Foreign Application Priority Data

Apr. 2, 2019 (KR) .......................... 10-2019-0038713

(51) Int. Cl.
*H04R 3/00* (2006.01)
*B08B 7/02* (2006.01)
(Continued)

(52) U.S. Cl.
CPC ............. *H04R 3/007* (2013.01); *B08B 7/026* (2013.01); *G06F 3/0484* (2013.01); *H04R 1/023* (2013.01);
(Continued)

(58) Field of Classification Search
None
See application file for complete search history.

(56) References Cited

U.S. PATENT DOCUMENTS 9,393,689 B2   7/2016   Kim
10,215,742 B2   2/2019   Choi et al.
(Continued)

FOREIGN PATENT DOCUMENTS

CN      107529105     12/2017
JP      2000-201388    7/2000
(Continued)

OTHER PUBLICATIONS

International Search Report and Written Opinion dated Jul. 27, 2020 in counterpart International Application No. PCT/KR2020/004491.
(Continued)

*Primary Examiner* — Kenny H Truong
(74) *Attorney, Agent, or Firm* — Nixon & Vanderhye, PC

(57) ABSTRACT

An electronic device includes a housing surrounding an exterior of the electronic device and including at least one opening, a sensor module including at least one sensor, a sound output device including sound output circuitry configured to output an acoustic-signal through the at least one opening, a memory, and a processor electrically connected to the sensor module and the sound output device, wherein the processor may be configured to: determine whether the electronic device is in a state where a foreign substance has entered into the electronic device through the at least one opening, determine whether the electronic device is in a first disposition state using the sensor module based at least on determining that the electronic device is in the state where the foreign substance has entered into the electronic device, and control the electronic device to output a specified acoustic-signal having a specified frequency band and a specified waveform through the sound output device based on the electronic device being in the first disposition state.

20 Claims, 11 Drawing Sheets

(51) Int. Cl.
    *H04R 1/28*     (2006.01)
    *H04R 29/00*     (2006.01)
    *H04R 1/02*     (2006.01)
    *G06F 3/0484*     (2022.01)
    *H04R 3/04*     (2006.01)

(52) U.S. Cl.
    CPC ............ *H04R 1/2811* (2013.01); *H04R 3/04* (2013.01); *H04R 29/001* (2013.01); *H04R 2400/01* (2013.01)

(56) References Cited

U.S. PATENT DOCUMENTS

| | | |
|---|---|---|
| 10,440,470 B2 | 10/2019 | Park et al. |
| 2015/0202772 A1 | 7/2015 | Kim |
| 2015/0219608 A1 | 8/2015 | Choi et al. |
| 2018/0206254 A1* | 7/2018 | Ahn ............... H04B 1/406 |
| 2018/0206354 A1 | 7/2018 | Yoon et al. |
| 2018/0227668 A1 | 8/2018 | Park et al. |
| 2018/0255412 A1 | 9/2018 | Ouyang |
| 2019/0349459 A1* | 11/2019 | Cha ............... H04R 1/023 |
| 2019/0394591 A1 | 12/2019 | Ouyang |
| 2020/0230647 A1 | 7/2020 | Shim et al. |

FOREIGN PATENT DOCUMENTS

| | | |
|---|---|---|
| JP | 2011-41292 | 2/2011 |
| KR | 10-2014-0081189 | 7/2014 |
| KR | 10-2018-0097382 | 8/2018 |
| KR | 10-2019-0012558 | 2/2019 |

OTHER PUBLICATIONS

Communication pursuant to Rule 164(1) EPC dated May 3, 2022 in counterpart European Patent Application No. 20783427.6.

* cited by examiner

METHOD FOR REMOVING DUST USING SPEAKER AND ELECTRONIC DEVICE SUPPORTING THE SAME

CROSS-REFERENCE TO RELATED APPLICATION

This application is based on and claims priority under 35 U.S.C. § 119 to Korean Patent Application No. 10-2019-0038713, filed on Apr. 2, 2019, in the Korean Intellectual Property Office, the disclosure of which is incorporated by reference herein its entirety.

BACKGROUND

1. Field

The disclosure relates to a method for removing dust using a speaker and an electronic device supporting the same.

2. Description of Related Art

Various mobile electronic devices, such as a smartphone, a tablet PC, and a laptop PC, have been released. The electronic device may perform various functions of voice call, video call, message transmission, video playback, or music playback. The electronic device may include a speaker or a receiver for a call for outputting sounds generated in a process of executing the above functions. The electronic device may include an opening (or a hole) for outputting the sounds to an outside of a housing, and the sounds generated by the speaker or the receiver may be emitted to the outside through the opening.

Depending on an environment (e.g. a desert region and a factory area) in which a user uses the electronic device, a foreign substance (e.g., soil, dust, sand, moisture) may be attached to an opening for outputting the sound. When the foreign substance is attached to the opening, the output of the sound may be interrupted by the foreign substance and it may be inconvenient for the user.

An electronic device according to the prior art prevents inflow of a foreign substance (e.g., soil, dust, sand, and moisture) by installing a mesh net in an opening for sound output. When the foreign substance (e.g., the soil, the dust, the sand, and the moisture) is adsorbed on the mesh net, the sound output may be disturbed. When a user discharges the foreign substance (e.g., the soil, the dust, the sand, and the moisture) by shaking the electronic device, it is inconvenient for the user and the foreign substance is not discharged efficiently.

The above information is presented as background information only to assist with an understanding of the disclosure. No determination has been made, and no assertion is made, as to whether any of the above might be applicable as prior art with regard to the disclosure.

SUMMARY

Embodiments of the disclosure may provide an electronic device that outputs an acoustic signal of a low frequency having a specific waveform to discharge the foreign substance (e.g., the soil, the dust, the sand, and the moisture) to outside of the electronic device or to separate the foreign substance (e.g., the soil, the dust, the sand, and the moisture) from the mesh net.

Embodiments of the disclosure address at least the above-mentioned problems and/or disadvantages and provide at least the advantages described below. Accordingly, an example embodiment of the disclosure provides an electronic device including: a housing surrounding an exterior of the electronic device, the housing including at least one opening, a sensor module including at least one sensor, a sound output device comprising sound output circuitry configured to output an acoustic signal through the at least one opening, a memory, and a processor electrically connected to the sensor module and the sound output device, wherein the processor may be configured to: determine whether the electronic device is in a state where a foreign substance has entered the at least one opening, determine whether the electronic device is in a first disposition state using the sensor module based at least on determining that the electronic device is in the state where the foreign substance has entered the at least one opening of the electronic device, and control the electronic device to output a specified acoustic signal having a specified frequency band and a specified waveform through the sound output device based on the electronic device being in the first disposition state.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
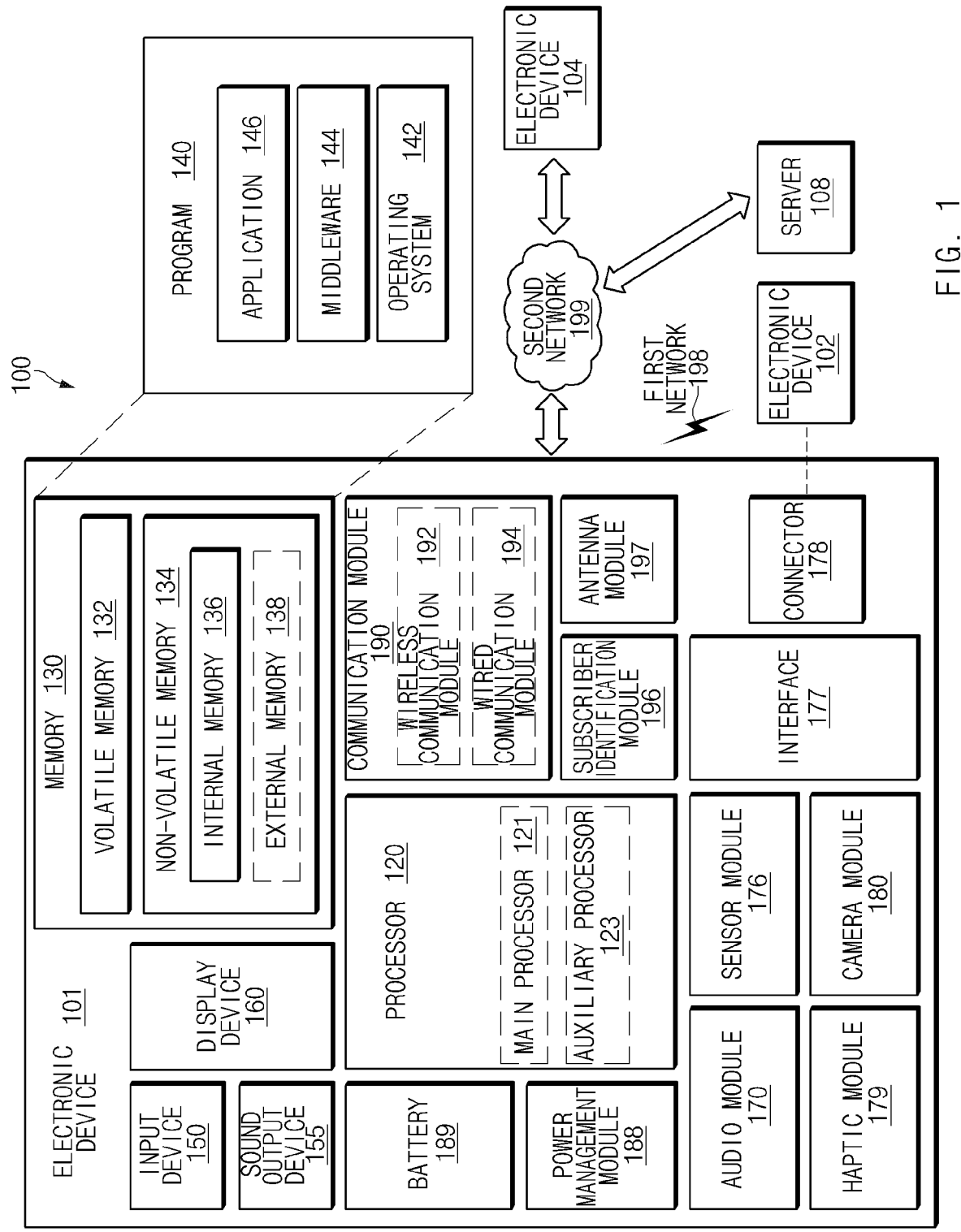
FIG. 1 is a block diagram illustrating an example electronic device in a network environment according to various embodiments.

Hereinafter, various example embodiments of the disclosure may be described with reference to accompanying drawings. However, this is not intended to limit the disclosure to specific embodiments, and it should be understood to include various modifications, equivalents, and/or alternatives of the embodiment of the disclosure. With regard to description of drawings, similar components may be marked by similar reference numerals.

FIG. 1 is a block diagram illustrating an example electronic device 101 in a network environment 100, according to various embodiments. An electronic device according to various embodiments of the disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, wearable devices, or the like, but is not limited thereto. The wearable device may include at least one of an accessory type (e.g., watches, rings, bracelets, anklets, necklaces, glasses, contact lens, head-mounted-devices (HMDs)), a fabric or garment-integrated type (e.g., an electronic apparel), a body-attached type (e.g., a skin pad or tattoos), a bio-implantable type (e.g., an implantable circuit), or the like, but is not limited thereto. According to some embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, electronic picture frames, or the like, but is not limited thereto.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), internet of things (e.g., light bulbs, sprinkler devices, fire alarms, thermostats, or street lamps), or the like, but is not limited thereto. The electronic device according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic device or may refer to a device (e.g., an artificial intelligence electronic device) that uses the electronic device.

Referring to FIG. 1, in the network environment 100, electronic device 101 may communicate with an electronic device 102 through short-range wireless communication 198 or may communication with an electronic device 104 or a server 108 through a network 199. According to an embodiment, the electronic device 101 may communicate with the electronic device 104 through the server 108.

According to an embodiment, the electronic device 101 may include a bus (not shown), a processor 120, an input device 150 (e.g., a micro-phone or a mouse), a display device 160, an audio module 170, a sensor module 176, an interface 177, a haptic module 179, a camera module 180, a power management module 188, a battery 189, a communication module 190, and a subscriber identification module 196. According to an embodiment, the electronic device 101 may not include at least one (e.g., the display device 160 or the camera module 180) of the above-described components or may further include other component(s).

The processor 120 may include one or more of a central processing unit (CPU), an application processor (AP), a graphic processing unit (GPU), an image signal processor (ISP) of a camera or a communication processor (CP). According to an embodiment, the processor 120 may be implemented with a system on chip (SoC) or a system in package (SiP). For example, the processor 120 may drive an operating system (OS) or an application program to control at least one of another component (e.g., hardware or software component) of the electronic device 101 connected to the processor 120 and may process and compute various data. The processor 120 may load a command or data, which is received from at least one of other components (e.g., the communication module 190), into a volatile memory 132 to process the command or data and may store the result data into a nonvolatile memory 134.

The memory 130 may include, for example, the volatile memory 132 or the nonvolatile memory 134. The volatile memory 132 may include, for example, a random access memory (RAM) (e.g., a dynamic RAM (DRAM), a static RAM (SRAM), or a synchronous DRAM (SDRAM)). The nonvolatile memory 134 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 134 may be configured in the form of an internal memory 136 or the form of an external memory 138 which is available through connection only if necessary, according to the connection with the electronic device 101. The external memory 138 may further include a flash drive such as compact flash (CF), secure digital (SD), micro secure digital (Micro-SD), mini secure digital (Mini-SD), extreme digital (xD), a multimedia card (MMC), or a memory stick. The external memory 138 may be operatively or physically connected with the electronic device 101 in a wired manner (e.g., a cable or a universal serial bus (USB)) or a wireless (e.g., Bluetooth) manner.

For example, the memory 130 may store, for example, at least one different software component, such as a command or data associated with the program 140, of the electronic device 101. The program 140 may include, for example, a kernel 141, a library 143, an application framework 145 or an application program (interchangeably, "application") 147.

The input device 150 may include a microphone, a mouse, or a keyboard. According to an embodiment, the keyboard may include a keyboard physically connected or a virtual keyboard displayed through the display device 160.

The display device 160 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 101.

The audio module 170 may convert, for example, from a sound into an electrical signal or from an electrical signal into the sound. According to an embodiment, the audio module 170 may acquire sound through the input device 150 (e.g., a microphone) or may output sound through an output device (not illustrated) (e.g., a speaker or a receiver) included in the electronic device 101, an external electronic device (e.g., the electronic device 102 (e.g., a wireless speaker or a wireless headphone)) or an electronic device 106 (e.g., a wired speaker or a wired headphone) connected with the electronic device 101.

The sensor module 176 may measure or detect, for example, an internal operating state (e.g., power or temperature) of the electronic device 101 or an external environment state (e.g., an altitude, a humidity, or brightness) to generate an electrical signal or a data value corresponding to the information of the measured state or the detected state. The sensor module 176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 176 may further include a control circuit for controlling at least one or more sensors included therein. According to an embodiment, the electronic device 101 may control the sensor module 176 by using the processor 11 or a processor (e.g., a sensor hub) separate from the processor 11. In the case that the separate processor (e.g., a sensor hub) is used, while the processor 11 is in a sleep state, the separate processor may operate without awakening the processor 11 to control at least a portion of the operation or the state of the sensor module 176.

According to an embodiment, the interface 177 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 178 may physically connect the electronic device 101 and the electronic device 106. According to an embodiment, the connector 178 may include, for example, an USB connector, an SD card/MMC connector, or an audio connector (e.g., a headphone connector).

The haptic module 179 may convert an electrical signal into mechanical stimulation (e.g., vibration or motion) or into electrical stimulation. For example, the haptic module 179 may apply tactile or kinesthetic stimulation to a user. The haptic module 179 may include, for example, a motor, a piezoelectric element, or an electric stimulator.

The camera module 180 may capture, for example, a still image and a moving picture. According to an embodiment, the camera module 180 may include at least one lens (e.g., a wide-angle lens and a telephoto lens, or a front lens and a rear lens), an image sensor, an image signal processor, or a flash (e.g., a light emitting diode or a xenon lamp).

The power management module 188, which is to manage the power of the electronic device 101, may constitute at least a portion of a power management integrated circuit (PMIC).

The battery 189 may include a primary cell, a secondary cell, or a fuel cell and may be recharged by an external power source to supply power at least one component of the electronic device 101.

The communication module 190 may establish a communication channel between the electronic device 101 and an external device (e.g., the first external electronic device 102, the second external electronic device 104, or the server 108). The communication module 190 may support wired communication or wireless communication through the established communication channel. According to an embodiment, the communication module 190 may include a wireless communication module 192 or a wired communication module 194. The communication module 190 may communicate with the external device through a first network 198 (e.g. a short range communication network such as Bluetooth or infrared data association (IrDA)) or a second network 199 (e.g., a wireless wide area network such as a cellular network) through a relevant module among the wireless communication module 192 or the wired communication module 194.

The wireless communication module 192 may support, for example, cellular communication, short-range wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The short-range wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 192 supports cellar communication, the wireless communication module 192 may, for example, identify or authenticate the electronic device 101 within a communication network using the subscriber identification module (e.g., a SIM card) 196. According to an embodiment, the wireless communication module 192 may include a communication processor (CP) separate from the processor 120 (e.g., an application processor (AP)). In this case, the communication processor may perform at least a portion of functions associated with at least one of components 110 to 196 of the electronic device 101 in substitute for the processor 120 when the processor 120 is in an inactive (sleep) state, and together with the processor 120 when the processor 120 is in an active state. According to an embodiment, the wireless communication module 192 may include a plurality of communication modules, each supporting only a relevant communication scheme among cellular communication, short-range wireless communication, or a GNSS communication.

The wired communication module 194 may include, for example, a local area network (LAN) service, a power line communication, or a plain old telephone service (POTS).

For example, the first network 198 may employ, for example, Wi-Fi direct or Bluetooth for transmitting or receiving commands or data through wireless direct connection between the electronic device 101 and the first external electronic device 102. The second network 199 may include a telecommunication network (e.g., a computer network such as a LAN or a WAN, the Internet or a telephone network) for transmitting or receiving commands or data between the electronic device 101 and the second electronic device 104.

According to various embodiments, the commands or the data may be transmitted or received between the electronic device 101 and the second external electronic device 104 through the server 108 connected with the second network 199. Each of the first and second external electronic devices 102 and 104 may be a device of which the type is different from or the same as that of the electronic device 101. According to various embodiments, all or a part of operations that the electronic device 101 will perform may be executed by another or a plurality of electronic devices (e.g., the electronic devices 102 and 104 or the server 108). According to an embodiment, in the case that the electronic device 101 executes any function or service automatically or in response to a request, the electronic device 101 may not perform the function or the service internally, but may alternatively or additionally transmit requests for at least a part of a function associated with the electronic device 101 to any other device (e.g., the electronic device 102 or 104 or the server 108). The other electronic device (e.g., the electronic device 102 or 104 or the server 108) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
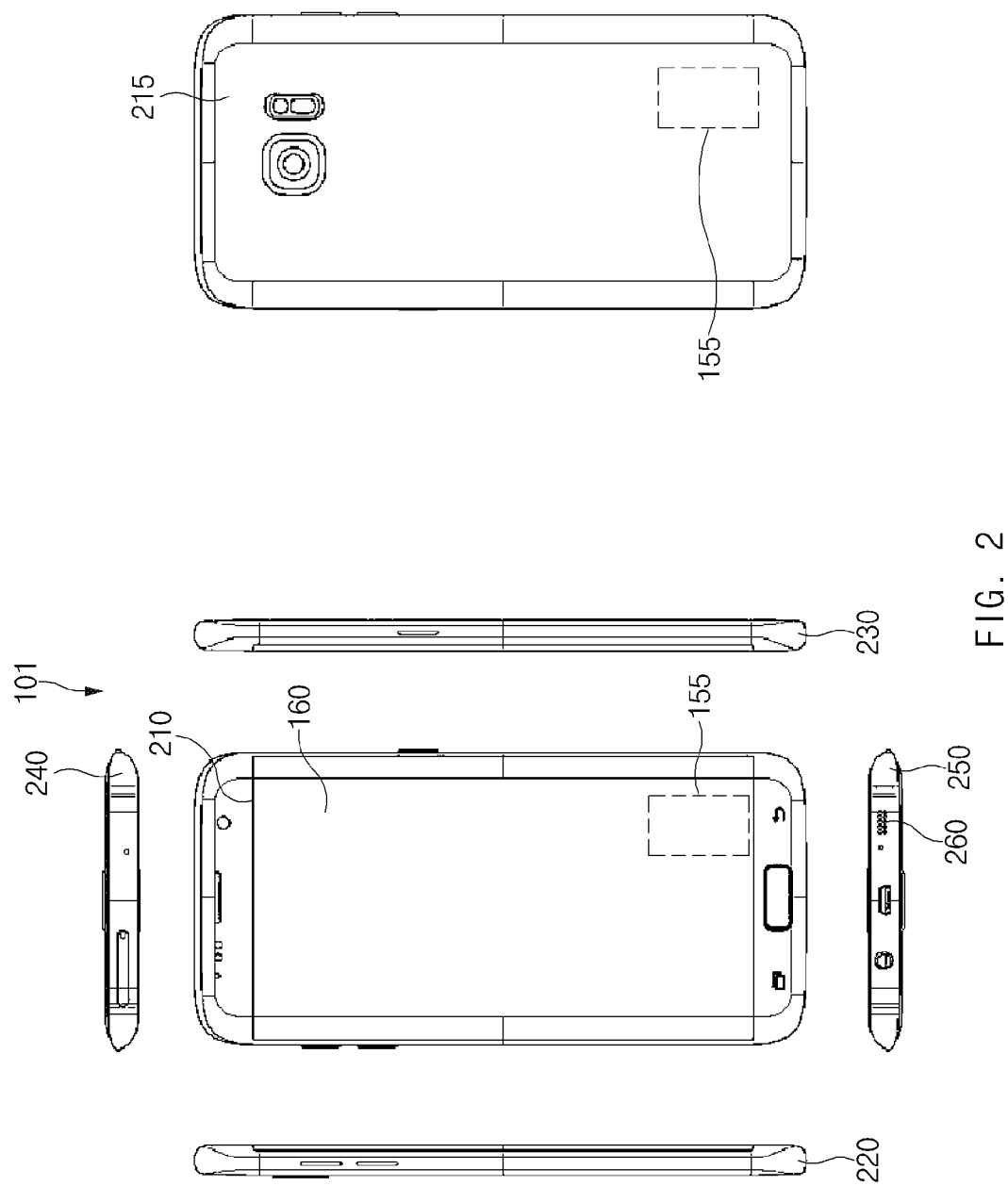
FIG. 2 is a diagram illustrating an outer appearance of an example electronic device according to various embodiments.

FIG. 2 is a diagram illustrating an outer appearance of an example electronic device according to various embodiments.

Referring to FIG. 2, the electronic device 101 may include a housing. The housing (or a case) may include a first surface (hereinafter, referred to as a front surface) 210, a second surface (hereinafter, referred to as a rear surface) 215, and side surfaces 220, 230, 240 and 250.

The electronic device 101 may include a display device (or a display) 160 on the front surface 210. The display device 160 may include, for example, and without limitation, a liquid crystal display (LCD), a light emitting diode (LED) display, an organic light emitting diode (OLED) display, a microelectromechanical system (MEMS) display, an electronic paper, or the like. The display device 160 may display, for example, various contents (e.g., a text, an image, a video, an icon, and/or a symbol, and the like) to the user.

The display device 160 may include a touch screen, and may receive, for example, a touch, a gesture, a proximity, or a hovering input using an electronic pen or a body part of the user.

According to various embodiments, the display device 160 may display a screen associated with removal of a foreign substance attached to or flowed into the electronic device 101. For example, the display device 160 may display a pop-up screen informing the user of inflow of dust. The display device 160 may display an UI of an application associated with dust removal. The display device 160 may display a progress of the dust removal.

According to various embodiments, the front surface 210 of the electronic device 101 may include at least one of a sub-camera, a sensor, and a receiver. The rear surface 215 of the electronic device 101 may include a main camera, a flash, and/or a fingerprint recognition device.

According to various embodiments, each of the side surface 220, 230, 240, and 250 of the electronic device 101 may include at least one of a physical button, a display, and a touch screen. According to an embodiment, one side surface (e.g., the bottom side surface 250) of the electronic device 101 may include a terminal to which a data communication (e.g., a USB) terminal or a power cable is connected.

According to an embodiment, one side surface (e.g., the bottom side surface 250) of the electronic device 101 may include an opening 260 through which a sound may be output. The opening 260 may be connected to a sound output device (e.g., a speaker) 155 disposed inside the electronic device 101 through a conduit. For example, the sound output from the sound output device (e.g., the speaker) 155 inside the electronic device 101 may be emitted to the outside of the electronic device 101 through the opening 260.

FIG. 2 illustrates an example in which the opening 260 is defined in the bottom side surface 250, but the disclosure is not limited thereto. For example, the opening 260 may be defined in the rear surface 215, the left/right side surface 220 or 230, the top side surface 240 of the electronic device 101, etc.

The electronic device 101 may include the sound output device 155 therein. The sound output device 155 may convert the electrical signal generated by the processor 120 inside the electronic device 101 into an acoustic signal and output the acoustic signal. The acoustic signal generated through the sound output device 155 may be emitted through the opening 260.

According to various embodiments, when the foreign substance (e.g., soil, dust, sand, and moisture) enters through the opening 260, the sound output device 155 may output a specified acoustic signal under control of the processor 120. The foreign substance (e.g., the soil, the dust, the sand, and the moisture) may be removed by vibration generated by the output of the specified acoustic signal.

According to various embodiments, the electronic device 101 may include a receiver (not shown) for a voice call. The receiver may output the acoustic signal under the control of the processor 120. The foreign substance (e.g., the soil, the dust, the sand, and the moisture) may be removed by the vibration generated by the output of the acoustic signal. Hereinafter, an example process of removing the foreign substance (e.g., the soil, the dust, the sand, and the moisture) will be described with respect to the sound output device 155, but the disclosure not limited thereto. The process of removing the foreign substance (e.g., the soil, the dust, the sand, and the moisture) with respect to the sound output device 155 may also be applied to the receiver.

According to various embodiments, the electronic device 101 may further include a vibration element (or a vibration motor or a haptic module) (e.g., the haptic module 179 of FIG. 1) that generates vibration. When the foreign substance enters through the opening 260, the processor 120 may generate a control signal for operating the vibration element. The vibration element may generate vibration of a specified pattern in response to the control signal. The foreign substance (e.g., the soil, the dust, the sand, and the moisture) attached to the electronic device 101 may be removed by the vibration.

Figure 3:
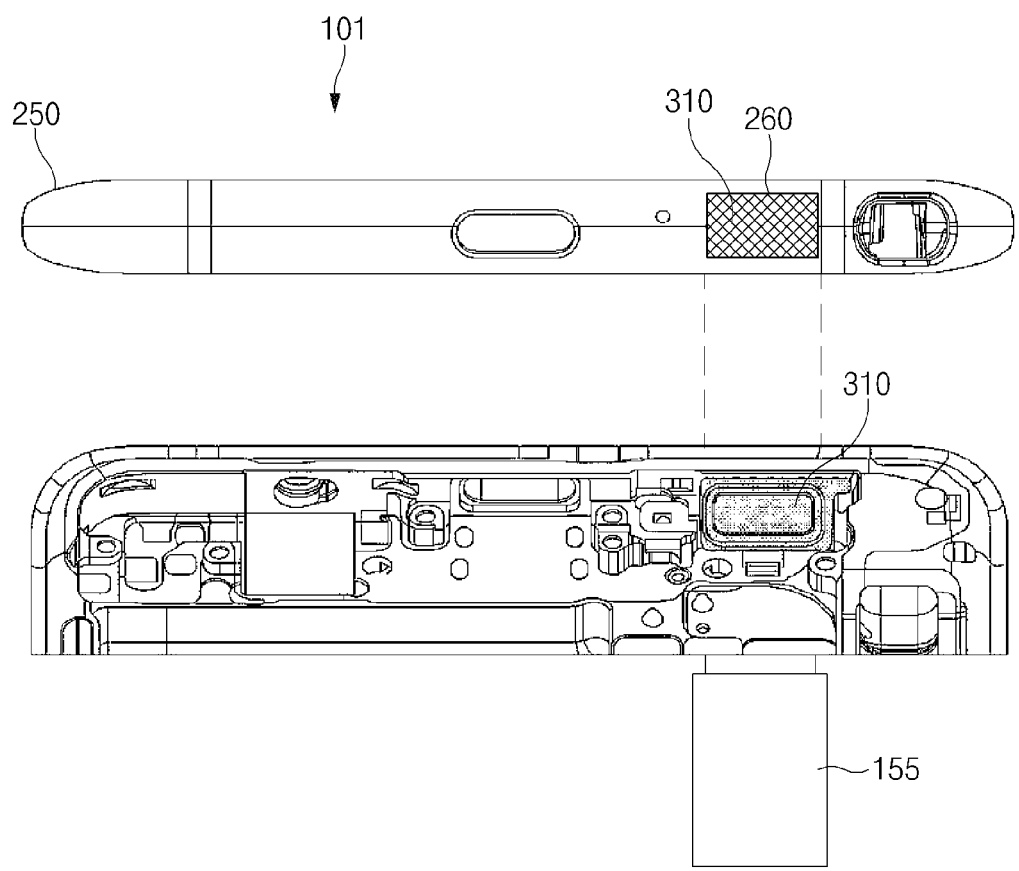
FIG. 3 is a diagram illustrating a region around an opening of the example electronic device according to various embodiments.

FIG. 3 is a diagram illustrating a region around an opening of the example electronic device according to various embodiments.

Referring to FIG. 3, the electronic device 101 may include the opening 260 in one side surface (e.g., the bottom side surface 250). The opening 260 may be provided adjacent to the conduit (or a passage) through which the acoustic signal is output from the sound output device 155 inside the electronic device 101. According to an embodiment, the opening 260 may include, for example, one hole or a plurality of holes.

The opening 260 may be connected to the conduit connected with the sound output device 155. The acoustic signal generated through the sound output device 155 may be output to the outside through the conduit provided between the opening 260 and the sound output device 155.

A decorative net (or a deco mesh) 310 may be attached to an inner surface of the opening 260. At least a portion of the decorative net 310 may be exposed or visible through the opening 260. The decorative net 310 may prevent and/or reduce an occurrence of internal parts of the electronic device 101 being viewed. In addition, the decorative net 310 may primarily block the foreign substance flowing from the outside. A separate blocking net (or a module mesh) (not shown, see FIG. 4) may be attached to a middle region of the conduit. The blocking net may block the foreign substance (e.g., the soil, sand grains, the dust, and the moisture) flowing from the outside into the sound output device 155.

When the electronic device 101 is used in an environment with a lot of foreign substances (e.g., the soil, the sand grains, the dust, and the moisture) around the electronic device 101, the foreign substance (e.g., the soil, the sand grains, the dust, and the moisture) may be attached to the decorative net 310 or the blocking net. Accordingly, the sound output through the opening 260 may be blocked or modified. When the foreign substance (e.g., the soil, the sand grains, the dust, and the moisture) is attached to the decorative net 310 or the blocking net, the processor 120 may output the acoustic signal of the specified waveform through the sound output device 155 to remove the foreign substance (e.g., the soil, the sand grains, the dust, and the moisture) attached to the decorative net 310 and/or the blocking net (see FIG. 8).

According to various embodiments, the processor 120 may control the electronic device 101 to operate the vibration element simultaneously while outputting the acoustic signal. Therefore, a removal effect of the foreign substance (e.g., the soil, the sand grains, the dust, and the moisture) attached to the decorative net 310 and/or the blocking net may be increased.

According to various embodiments, the processor 120 may control the electronic device to output the specified acoustic signal that removes the foreign substance (e.g., the soil, the sand grains, the dust, and the moisture) when the opening 260 is directed in a specified direction (e.g., a gravity direction or a ground direction). When the opening 260 is directed in a direction other than the ground direction, the foreign substance separated from the decorative net 310 or the blocking net may be reattached to the electronic device 101 or flow into the electronic device 101. To prevent and/or avoid this, the processor 120 may control the electronic device 101 to output the specified acoustic signal when the opening 260 is directed in the specified direction (e.g., the gravity direction or the ground direction), which may be determined using the sensor module (e.g., the gyro sensor) 176. When the opening 260 is not directed in the specified direction (e.g., the gravity direction or the ground direction), the user may be induced to change a direction of the electronic device 101 through a notification.

Figure 4:
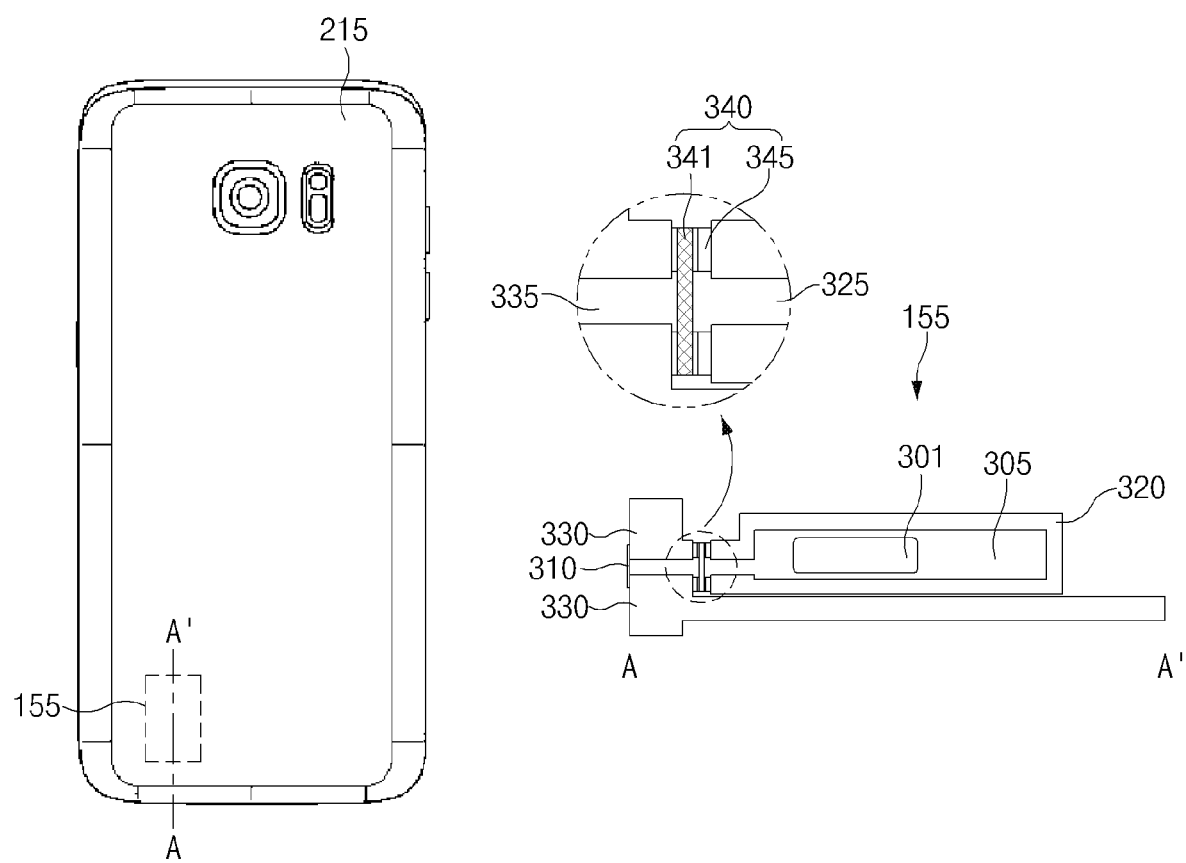
FIG. 4 is a cross-sectional view illustrating an example sound output device according to various embodiments.

FIG. 4 is a cross-sectional view illustrating an example sound output device according to various embodiments.

Referring to FIG. 4, the electronic device 101 may include the sound output device 155 therein. The sound output device 155 may generate the acoustic signal and output the generated acoustic signal to the outside. According to an embodiment, the sound output device 155 may output the acoustic signal for removing the foreign substance (e.g., the soil, the sand grains, the dust, and the moisture) attached to the decorative net 310 and/or a blocking net 341.

The sound output device 155 may include a speaker 301, an enclosure (a speaker housing) 320, an internal housing 330, and a sealing member 340.

The speaker 301 may convert the electrical signal provided from the interior of the electronic device 101 into the acoustic signal and output the acoustic signal. The enclosure 320 may surround the speaker 301. The enclosure 320 may separate the speaker 301 from the interior of the electronic device 101. The enclosure 320 may prevent and/or reduce the acoustic signal output from the speaker 301 from leaking to another portion of the electronic device 101 (e.g., preventing deterioration of a sound performance). The enclosure 320 may include a first conduit 325 therein for inducing the acoustic signal to be emitted to the outside.

A sound space 305 may be provided between the enclosure 320 and the speaker 301. The acoustic signal generated from the speaker 301 may be transmitted through air contained in the sound space 305 and may be output to the outside through the first conduit 325 provided in the enclosure 320.

The internal housing 330 may fix the enclosure 320. The internal housing 330 may include a second conduit 335 therein connected with the first conduit 325 of the enclosure 320.

The decorative net (or the deco mesh) 310 may be attached to an outer surface of the internal housing 330 or formed in the housing at a middle region of the second conduit 335. The decorative net 310 may primarily block the foreign substance entering from the outside.

The sealing member 340 may be disposed between the enclosure 320 and the internal housing 330. The sealing member 340 may include a blocking net (or a module mesh) 341, a rubber 345, and the like. The blocking net 341 and the rubber 345, and the blocking net 341 and the internal housing 330 may be adhered to each other by an adhesive material (e.g., a tape).

The blocking net 341 may block the foreign substance (e.g., the soil, the sand grains, the dust, and the moisture) from entering through the second conduit 335 into the enclosure 320. The blocking net 341 may be disposed between the first conduit 325 and the second conduit 335 through which the acoustic signal is output. The blocking net 341 may be attached to form specified angles with or to be perpendicular to the first conduit 325 and the second conduit 335.

The blocking net 341 may pass the acoustic signal to the outside, and block the foreign substance (e.g., the soil, the sand grains, the dust, and the moisture) from entering the inside. At least some of the blocked foreign substances (e.g., the soil, the sand grains, the dust, and the moisture) may be attached to the blocking net 341. The acoustic signal output from the speaker 301 may be modified or blocked by the foreign substance (e.g., the soil, the sand grains, the dust, and the moisture) attached to the blocking net 341. The blocking net 341 may be formed in a denser form than the decorative net 310. The denser the blocking net 341, the better the performance of blocking the foreign substance (e.g., the soil, the sand grains, the dust, and the moisture), and the looser the blocking net 341, the lower the performance of blocking the foreign substance (e.g., the soil, the sand grains, the dust, and the moisture).

According to various embodiments, the foreign substance (e.g., the soil, the sand grains, the dust, and the moisture) attached to the blocking net 341 or the decorative net 310 may be removed by the acoustic signal generated from the speaker 301. When the electronic device 101 is directed in the specified direction (e.g., the gravity direction or the ground direction), the foreign substance separated from the blocking net 341 or the decorative net 310 may be discharged to the outside of the electronic device 101.

Figure 5:
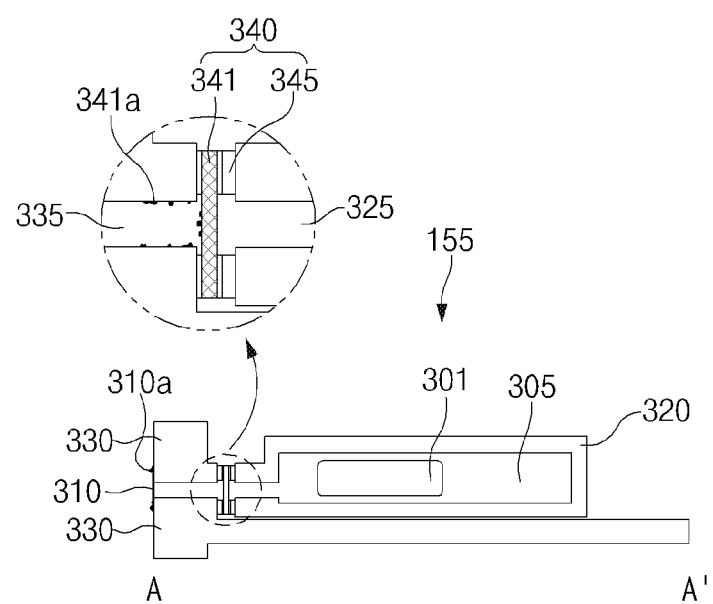
FIG. 5 is a diagram illustrating an example in which a foreign substance is attached to an interior of a sound output device according to various embodiments.

FIG. 5 is a diagram illustrating an example in which a foreign substance is attached to an interior of a sound output device according to various embodiments.

Referring to FIG. 5, the electronic device 101 may include the sound output device 155 therein. The sound output device 155 may generate the acoustic signal and output the generated acoustic signal to the outside. The sound output device 155 may convert the electrical signal into the sound. According to an embodiment, the sound output device 155 may include a vibration plate therein. In response to the electrical signal, a current may flow along a coil of the vibration plate, and the coil may be moved by the Fleming's left-hand rule. The vibration plate is vibrated by the coil and a longitudinal wave is formed in the air, so that the sound may be transmitted to the outside.

The decorative net (or the deco mesh) 310 may be attached to the outer surface of the internal housing 330. The decorative net 310 may primarily block the foreign substance (e.g., the soil, the sand grains, the dust, and the moisture) entering from the outside. A foreign substance (e.g., the soil, the sand grains, the dust, and the moisture) 310a may be attached to the decorative net 310. The acoustic signal output through the speaker 301 may be modified or blocked by the foreign substance (e.g., the soil, the sand grains, the dust, and the moisture) 310a attached to the decorative net 310.

The decorative net 310 may be separated from the foreign substance (e.g., the soil, the sand grains, the dust, and the moisture) 310a by the specified acoustic signal generated from the speaker 301. The acoustic signal may be an acoustic signal having specified frequency and waveform such that the decorative net 310 is easily separated from the foreign substance 310a. When the electronic device 101 is directed in the specified direction (e.g., the gravity direction or the ground direction), the separated foreign substance 310a may be emitted to the outside of the electronic device 101.

Some of the foreign substances (e.g., the soil, the sand grains, the dust, and the moisture) may pass through the decorative net 310 and may enter into the electronic device 101. A foreign substance (e.g., the soil, the sand grains, the dust, and the moisture) 341a may be attached to the second conduit 335 and the blocking net 341. The acoustic signal output through the speaker 301 may be modified or blocked by the foreign substance (e.g., the soil, the sand grains, the dust, and the moisture) 341a attached to the second conduit 335 and the blocking net 341.

The blocking net 341 may be separated from the foreign substance (e.g., the soil, the sand grains, the dust, and the moisture) 341a by the specified acoustic signal generated from the speaker 301. The acoustic signal may be an acoustic signal having specified frequency and waveform such that the blocking net 341 is easily separated from the foreign substance 341a. When the electronic device 101 is directed in the specified direction (e.g., the gravity direction or the ground direction), the separated foreign substance 310a may be discharged to the outside of the electronic device 101 along the second conduit 335.

Figure 6:
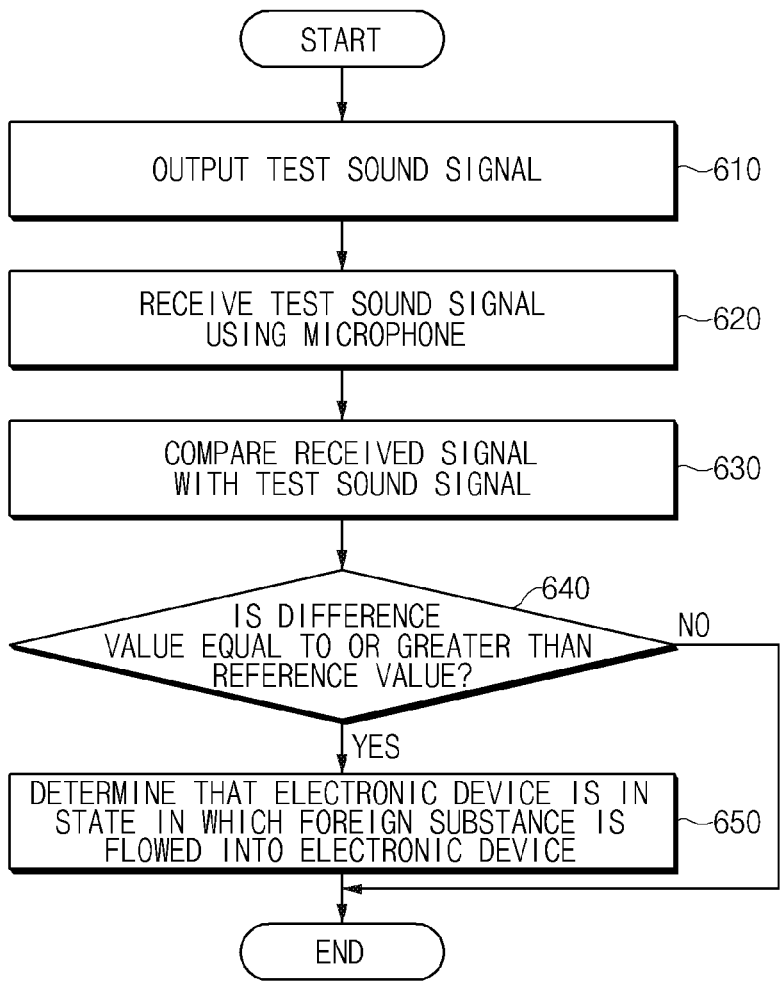
FIG. 6 is a flowchart illustrating an example process of sensing attachment or inflow of a foreign substance according to various embodiments.

FIG. 6 is a flowchart illustrating an example process of sensing attachment or inflow of a foreign substance according to various embodiments.

Referring to FIG. 6, in operation 610, the processor 120 may control the electronic device 101 to output a test acoustic (sound) signal through the sound output device 155. The test acoustic signal may be a signal output to determine whether the foreign substance (e.g., the soil, the sand grains, the dust, and the moisture) is attached to the decorative net 310 and/or blocking net 341 to interfere with the sound output.

According to an embodiment, the test acoustic signal may be an acoustic signal of an audible frequency band that the user is able to hear. According to another embodiment, the test acoustic signal may be an acoustic signal of an inaudible frequency band that the user is not able to hear.

According to an embodiment, the processor 120 may control the electronic device 101 to output the test acoustic signal by a separate user input. For example, the processor 120 may execute an application associated with the discharge of the foreign substance (e.g., the soil, the sand grains, the dust, and the moisture). When a user interface of the application is executed, and the user generates a specified input through the user interface, the processor 120 may control the electronic device 101 to output the test acoustic signal in response to the specified input.

According to another embodiment, the processor 120 may automatically control the electronic device 101 to output the test acoustic signal under a specified condition without the separate user input. For example, the processor 120 may control the electronic device 101 to output the test acoustic signal every specified period (e.g., every hour), and may determine whether the sound output is blocked and interrupted by the foreign substance (e.g., the soil, the sand grains, the dust, and the moisture). In another example, when the electronic device 101 is identified to be in a desert region through the GPS, the processor 120 may control the electronic device 101 to output the test acoustic signal to determine whether the sound output is blocked and interrupted by the foreign substance (e.g., the soil, the sand grains, the dust, and the moisture).

In operation 620, the processor 120 may receive the test acoustic signal output through the sound output device 155 using the microphone.

In operations 630 and 640, the processor 120 may compare the test acoustic signal received using the microphone with a test acoustic signal stored in the memory 130. For example, the processor 120 may compare a waveform similarity or an intensity average value between the signal received using the microphone and the test acoustic signal stored in the memory 130. For example, when the signal received through the microphone is equal to or less than (or less than) a specified intensity (e.g., a difference between the stored test sound signal and the received test sound signal), the processor 120 may determine that the foreign substance (e.g., the soil, the sand grains, the dust, and the moisture) has entered into the sound output device 155.

In operation 650, when a difference value between the signal received using the microphone and the test acoustic signal stored in the memory 130 is equal to or greater than a reference value ("Yes" in operation 640), the processor 120 may determine that the electronic device 101 is in a state in which the foreign substance (e.g., the soil, the sand grains, the dust, and the moisture) has entered into the electronic device 101. In this case, the processor 120 may start a process for removing the foreign substance (e.g., the soil, the sand grains, the dust, and the moisture) (see FIG. 7).

When the difference value between the signal received using the microphone and the test acoustic signal stored in the memory 130 is less than the reference value, the processor 120 may not perform a separate process of discharging the separate foreign substance (e.g., the soil, the sand grains, the dust, and the moisture). The processor 120 may output the test acoustic signal based on the specific period to determine whether the foreign substance is flowed.

Figure 7:
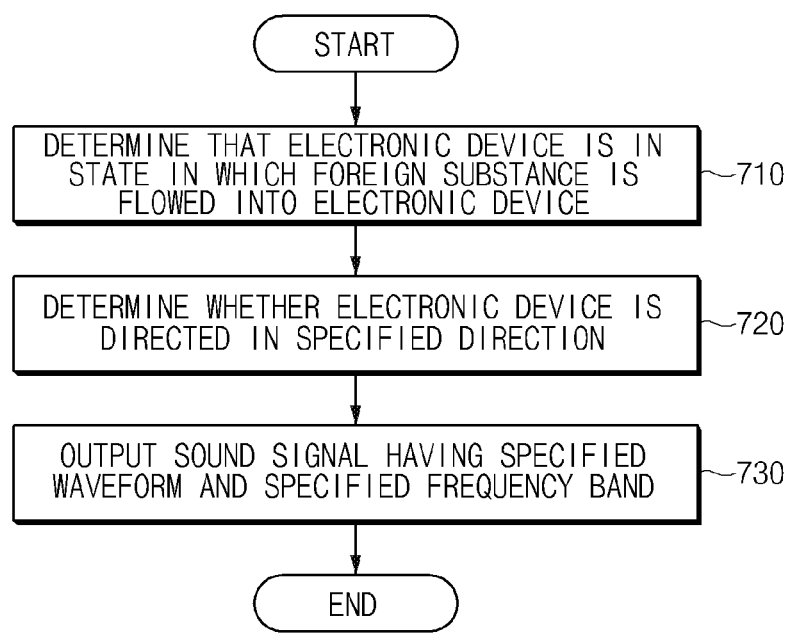
FIG. 7 is a flowchart illustrating an example sound output process for discharging a foreign substance according to various embodiments.

FIG. 7 is a flowchart illustrating an example sound output process for discharging a foreign substance according to various embodiments.

Referring to FIG. 7, in operation 710, the processor 120 may determine whether the electronic device 101 is in a state in which the foreign substance has entered through the opening 260 (hereinafter, referred to as a first state). For example, the processor 120 may control the electronic device 101 to output the test acoustic signal of FIG. 6 to determine whether the electronic device 101 is in the first state. As another example, the processor 120 may execute the application associated with the discharge of the foreign substance (e.g., the soil, the sand grains, the dust, and the moisture). When the user interface of the application is executed and the user generates the specified input through the user interface, it may be determined that the electronic device 101 is in the first state.

In operation 720, when the electronic device 101 is in the first state, the processor 120 may determine whether the electronic device 101 is in a state (hereinafter, referred to as a second state) in which a portion in which the opening 260 of the housing 330 is directed in the first direction (e.g., the ground direction or the gravity direction) using the sensor module.

For example, the processor 120 may determine a direction in which the portion in which the opening 260 of the housing 330 of the electronic device 101 is directed using the gyro sensor. When the direction in which the portion in which the opening 260 of the housing is directed is the first direction (e.g., the ground direction or the gravity direction), the processor 120 may determine that the electronic device 101 is in the second state. When the direction in which the portion in which the opening 260 is defined is directed is within a specified angle range (e.g., within 60 degrees) with respect to the first direction, the processor 120 may determine that the electronic device 101 is in the second state.

According to an embodiment, when the electronic device 101 is not in the second state, the processor 120 may not proceed with the process of discharging the foreign substance, or may induce the user to change the state of the electronic device 101 through a user notification (e.g., a pop-up).

In operation 730, when the electronic device 101 is in the second state, the processor 120 may control the electronic device 101 to output an acoustic signal having a specified waveform and a specified frequency band through the sound output device 155. When a sound wave by the acoustic signal is output from the sound output device 155, a longitudinal wave including compression and rarefaction waves may spread into the air. The compression wave output from the sound output device 155 may generate an air pressure transmitted through the air, which is a medium. The foreign substance (e.g., the soil, the sand grains, the dust, and the moisture) attached to the decorative net 310 or the blocking net 341 may be separated by the air pressure.

According to an embodiment, the frequency band may, for example, and without limitation, be a low frequency band equal to or less than about 30 Hz. The waveform may, for example, and without limitation, be at least one of a pulse wave, a square wave, and a sawtooth wave.

According to an embodiment, the acoustic signal may be an audible signal that the user is able to hear. According to another embodiment, the acoustic signal may be an inaudible signal that the user is not able to hear.

According to various embodiments, the processor 120 may allow a maximum intensity of the acoustic signal to correspond to a maximum output of the sound output device 155. For example, when the acoustic signal is the square wave, in a section where an output of a first acoustic signal is HIGH, the processor 120 may control the electronic device 101 to output a sound by the maximum output (e.g., about 2 W) of the sound output device 155.

According to various embodiments, the processor 120 may allow at least one of the waveform or the intensity of the acoustic signal to change over time. For example, the processor 120 may control the electronic device 101 to output the first acoustic signal having a first frequency band and a specified first waveform for a first time period, and may output a second acoustic signal having a specified second frequency band and a specified second waveform for a second time period after the first time period.

According to various embodiments, the processor 120 may change at least one of the frequency band, the waveform, and the intensity of the acoustic signal for discharging the foreign substance based on an angle between the portion in which the opening 260 of the housing 330 and the first direction (e.g., the ground direction or the gravity direction). For example, and without limitation, the processor 120 may increase the intensity of the acoustic signal for discharging the foreign substance when the angle between the portion in which the opening 260 of the housing 330 and the gravity direction is 30 degrees rather than 60 degrees.

According to various embodiments, the processor 120 may simultaneously operate the vibration element (e.g., the vibration motor) while outputting the acoustic signal. For example, the processor 120 may control the vibration element (e.g., the vibration motor) to produce a vibration force of, for example, and without limitation, about 1 to 1.5 G at a period of about 100 to 200 Hz while outputting the acoustic signal. In an embodiment, the processor 120 may output the acoustic signal in association with an operation pattern of the vibration element.

According to various embodiments, the processor 120 may detect an earphone connection and may output the acoustic signal through the sound output device 155 even during the earphone connection.

According to various embodiments, the processor 120 may detect the direction that the electronic device 101 is directed in the process of outputting the acoustic signal. The processor 120 may stop the output of the acoustic signal when the electronic device 101 is changed to be directed in a different direction in the second state.

According to various embodiments, the processor 120 may control the electronic device 101 to stop the output of the first acoustic signal after a specified time elapses. After the output of the acoustic signal is stopped, the processor 120 may control the electronic device 101 to output the test acoustic signal by the user input or automatically and determine whether to continue to output the first acoustic signal.

Figure 8:
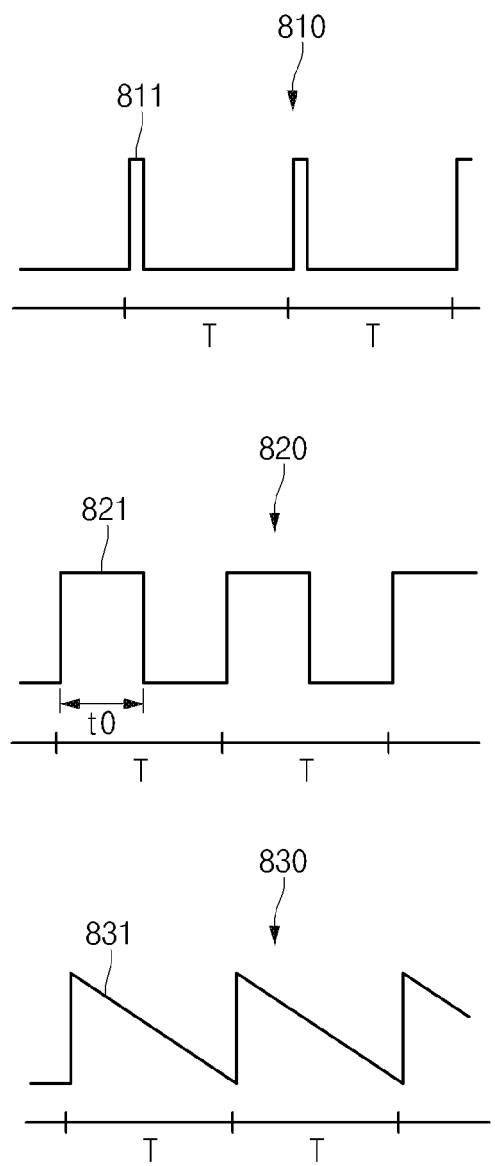
FIG. 8 is a diagram illustrating example waveforms of a first sound output signal for removing a foreign substance according to various embodiments.

FIG. 8 is a diagram illustrating example waveforms of a first sound output signal for removing a foreign substance according to various embodiments. FIG. 8 is illustrative and the disclosure is not limited thereto.

Referring to FIG. 8, the processor 120 may control the electronic device 101 to output the first acoustic signal having the specified first waveform and the specified first frequency band through the sound output device 155. The first acoustic signal may have at least one waveform of a pulse wave 810, a square wave 820, and a sawtooth wave 830. The first acoustic signal may be a signal of a low frequency band of equal to or less than about 30 Hz.

When the first acoustic signal is the pulse wave 810, the processor 120 may control the electronic device 101 to output one pulse signal 811 for a specified period during the period T. An intensity of the pulse signal 811 may correspond to the maximum output of the sound output device 155.

When the first acoustic signal is the square wave 820, the processor 120 may control the electronic device 101 to output one rectangular signal 821 during the specified period T. The square signal 821 may maintain a High state for a specified time t0 in the period T and maintain a Low state for the remaining time. An intensity of the square signal 821 while maintaining the High state may correspond, for example, to the maximum output of the sound output device 155.

When the first acoustic signal is the sawtooth wave 830, the processor 120 may control the electronic device 101 to output one sawtooth signal 831 for the specified period T. The sawtooth signal 831 may be changed linearly (or nonlinearly) from a High state to a Low state in a period T. An intensity of the sawtooth wave 830 at a point where the sawtooth signal 831 starts may correspond to the maximum output of the sound output device 155.

According to various embodiments, the processor 120 may control the electronic device 101 to output an acoustic signal whose waveform changes over time through the sound output device 155. For example, the processor 120 may control the electronic device 101 to output the first acoustic signal of the pulse wave 810 for the first time period (e.g., about 3 seconds), and then may output the second acoustic signal of the square wave 820 for the second time period (e.g., about 5 seconds) after the first time period.

According to various embodiments, the processor 120 may control the electronic device 101 to output an acoustic signal having a frequency that changes over time through the sound output device 155. For example, the processor 120 may control the electronic device 101 to output the first acoustic signal of the first frequency (e.g., 30 Hz) for the first time period (e.g., about 10 seconds), and then output the second acoustic signal of the second frequency (e.g., about 10 Hz) for the second time period (e.g., about 10 seconds) after the first time period. According to an embodiment, the processor 120 may control the electronic device 101 to output the acoustic signal by sequentially increasing or decreasing the frequency of the acoustic signal over time.

According to various embodiments, the processor 120 may control the electronic device 101 to output an acoustic signal whose intensity changes over time through the sound output device 155. For example, the processor 120 may output the pulse wave 810 at a first intensity (e.g., 2 W) for the first time period (e.g., about 10 seconds), and then output the pulse wave 810 at a second intensity (e.g., about 1 W) for the second time period (e.g., about 5 seconds) after the first time period.

Figure 9:
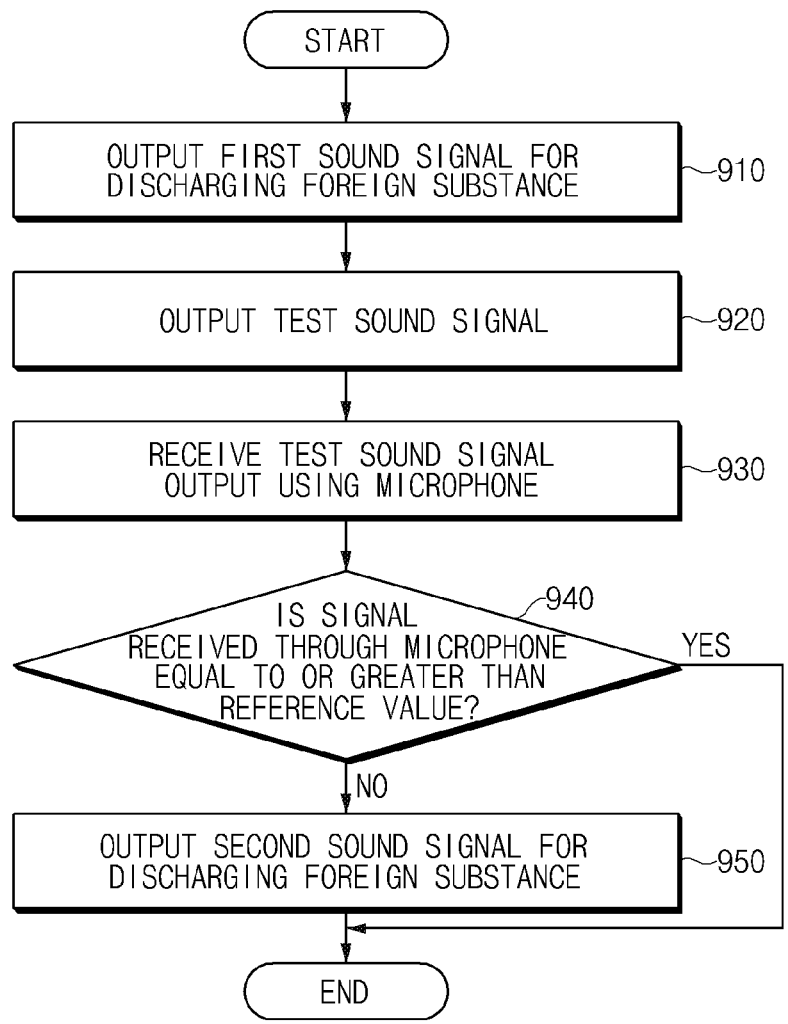
FIG. 9 is a flowchart illustrating an example method for changing sound output based on a foreign substance state sensing result after the sound output according to various embodiments.

FIG. 9 is a flowchart illustrating an example method for changing sound output based on a foreign substance state sensing result after the sound output according to various embodiments.

Referring to FIG. 9, in operation 910, the processor 120 may control the electronic device 101 to output the first acoustic signal having the specified first waveform and the specified first frequency band through the sound output device 155 for discharging the foreign substance. The first frequency band may, for example, be the low frequency band of equal to or less than 30 Hz. The first waveform may, for example, and without limitation, be at least one of the pulse wave, the square wave, and the sawtooth wave.

In operation 920, after the specified time, the processor 120 may control the electronic device 101 to output the test acoustic signal through the sound output device 155. The test acoustic signal may be the signal output to determine whether the foreign substance (e.g., the soil, the sand grains, the dust, and the moisture) is attached to the decorative net 310 or the blocking net 341 to interfere with the sound output.

In operation 930, the processor 120 may receive the test acoustic signal output through the sound output device 155 using the microphone.

In operation 940, the processor 120 may determine whether the signal received through the microphone is equal to or greater than a specified reference value. According to an embodiment, the reference value may be a value associated with the waveform (e.g., the waveform similarity and a waveform distribution) or a value associated with the intensity (e.g., the intensity average value, an intensity maximum value, and an intensity minimum value).

According to an embodiment, when the signal received through the microphone is equal to or greater than the specified reference value, the processor 120 may end the sound output process for discharging the foreign substance.

In operation 950, when the signal received through the microphone is less than (or equal to or less than) the specified reference value ("No" in operation 940), the processor 120 may control the electronic device 101 to output the second acoustic signal having the specified second waveform and the specified second frequency band through the sound output device 155. The second acoustic signal may be a signal having a waveform and a frequency band different from those of the first acoustic signal in operation 910. For example, when the first frequency band is 20 Hz and the first waveform is the square wave, the second frequency band is 30 Hz and the second waveform may be the pulse wave.

According to various embodiments, the processor 120 may additionally control the electronic device 101 to output the test acoustic signal to sense a discharge state of the foreign substance, and determine whether to output the acoustic signal for discharging the foreign substance additionally.

According to various embodiments, the processor 120 may change the intensity of the first acoustic signal or the second acoustic signal and control the electronic device 101 to output the first or second acoustic signal with the changed intensity based on the intensity of the signal received through the microphone. For example, the lower the intensity of the signal received through the microphone is, the larger the intensity of the first or second acoustic signal output by the processor 120.

Figure 10:
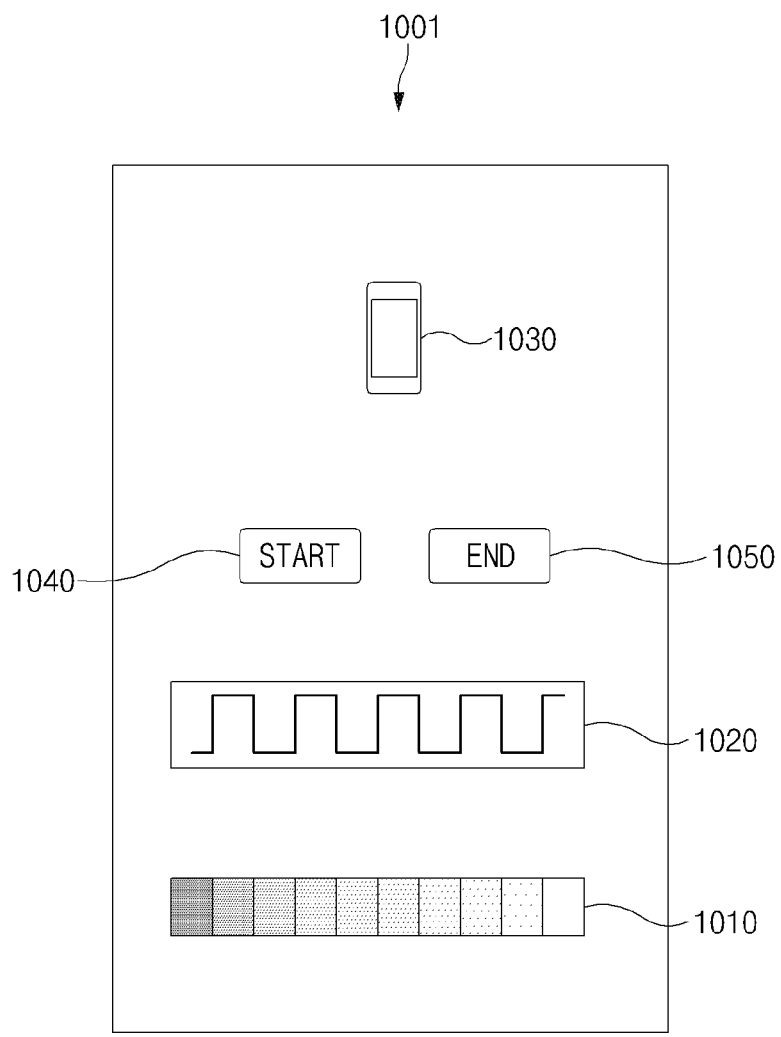
FIG. 10 is a diagram illustrating an example user interface for outputting an acoustic signal for discharging a foreign substance according to various embodiments.

FIG. 10 is a diagram illustrating an example of a user interface for outputting an acoustic signal for discharging a foreign substance according to various embodiments. FIG. 10 is illustrative, and the disclosure is not limited thereto.

Referring to FIG. 10, a user interface 1001 may include a discharging state indication 1010, a waveform indication 1020, a direction indication 1030, a start button 1040/end button 1050, or combinations thereof.

The discharging state indication 1010 may be changed based on an output result of the test acoustic signal. Before the first acoustic signal discharging the foreign substance is output or after the output of the first acoustic signal is ended, the processor 120 may change the discharging state indication 1010 based on the output result of the test acoustic signal.

The waveform indication 1020 may indicate the frequency/waveform at which the first acoustic signal is output. The processor 120 may display the waveform indication 1020 by simplifying or modifying the waveform of the first acoustic signal.

The direction indication 1030 may change depending on the direction in which the electronic device 101 is directed. The processor 120 may detect whether the portion in which the opening 260 is defined of the electronic device 101 is directed in the first direction (e.g., the ground direction or the gravity direction) using the sensor module (e.g., the acceleration sensor). When the electronic device 101 is in the second state, the processor 120 may change the direction indication 1030 to green. When the electronic device 101 is not in the second state, the processor 120 may change the direction indication 1030 to red to induce the user to change the direction of the electronic device 101.

The start button 1040/end button 1050 may start or end the output of the first acoustic signal. When a touch input of the user occurs on the start button 1040, the processor 120 may output the first acoustic signal. When the touch input of the user occurs on the end button 1050, the processor 120 may end the output of the first acoustic signal.

The user interface 1001 of FIG. 10 is simply an example and the disclosure is not limited thereto. Some configurations may be omitted or added. For example, the user interface 1001 may further include a button for changing the waveform of the first acoustic signal. The start button 1040/end button 1050 may be implemented as one button. The button may be indicated as start before the output of the first acoustic signal and end during the output.

Figure 11:
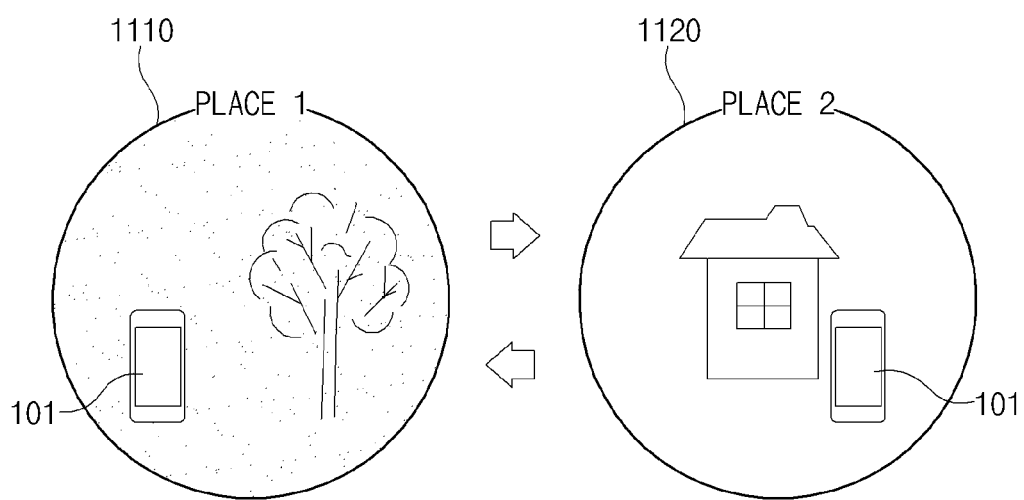
FIG. 11 is a diagram illustrating an example output of an acoustic signal discharging a foreign substance based on place movement according to various embodiments.

FIG. 11 is a diagram illustrating examples of output of an acoustic signal emitting a foreign substance based on place movement according to various embodiments. FIG. 11 is illustrative and the disclosure is not limited thereto.

Referring to FIG. 11, the processor 120 may collect location information of the electronic device 101 using the sensor module (e.g., the GPS) or the communication module. The processor 120 may set a scheme for discharging the foreign substance differently based on the location information.

For example, when a location of the electronic device 101 is a first location 1110 (e.g., outdoor playground or a construction site), the processor 120 may not proceed with the process of discharging the foreign substance. When the location of the electronic device 101 is a second location 1120 (e.g., inside a house or inside a building), the processor 120 may proceed with the process of discharging the foreign substance.

According to various embodiments, the processor 120 may differently set the scheme for emitting the foreign substance based on time information. For example, the processor 120 may proceed with the process of discharging the foreign substance when the location of the electronic device 101 is the second location 1020 (e.g., inside the house or inside the building) after 7:00 pm.

According to various embodiments, the processor 120 may differently set the scheme for discharging the foreign substance based on weather information. For example, the processor 120 may collect the weather information through an external server. When it is windy or when a dust concentration is high, and when the electronic device 101 reaches a specified place (e.g., home or work), the processor 120 may output the acoustic signal for discharging the foreign substance.

According to various embodiments, the processor 120 may proceed with the process of discharging the foreign substance using the sensor module (e.g., the illumination sensor and the proximity sensor) when the user is not nearby. Alternatively, when the electronic device 101 is in a separate state without a movement (e.g., in a state of being placed on a table), the processor 120 may output the acoustic signal for discharging the foreign substance.

An electronic device (e.g., the electronic device 101 of FIG. 1 or 2) according to various example embodiments may include: a housing surrounding an exterior of the electronic device (e.g., the electronic device 101 of FIG. 1 or 2), the housing including at least one opening (e.g., the opening 260 of FIG. 2), a sensor module (e.g., the sensor module 176 of FIG. 1), a sound output device (e.g., the sound output device 155 of FIG. 2) configured to output an acoustic signal through the at least one opening (e.g., the opening 260 of FIG. 2), a memory (e.g., the memory 130 of FIG. 1), and a processor (e.g., the processor 120 of FIG. 1) electrically connected to the sensor module (e.g., the sensor module 176 of FIG. 1) and the sound output device (e.g., the sound output device 155 of FIG. 2), wherein the processor (e.g., the processor 120 of FIG. 1) may be configured to: determine whether the electronic device (e.g., the electronic device 101 of FIG. 1 or 2) is in a state where a foreign substance has entered into the electronic device through the at least one opening (e.g., the opening 260 of FIG. 2), determine whether the opening (e.g., the opening 260 of FIG. 2) of the electronic device (e.g., the electronic device 101 of FIG. 1 or 2) is directed in a specified direction using the sensor module (e.g., the sensor module 176 of FIG. 1) based at least on determining that the electronic device (e.g., the electronic device 101 of FIG. 1 or 2) is in the state where the foreign substance has entered into the electronic device, and control the electronic device to output a specified acoustic signal having a specified frequency band and a specified waveform through the sound output device (e.g., the sound output device 155 of FIG. 2) based at least on determining that the electronic device (e.g., the electronic device 101 of FIG. 1 or 2) is directed in the specified direction.

According to various example embodiments, the electronic device (e.g., the electronic device 101 of FIG. 1 or 2) may further include a microphone (e.g., the input device 150 of FIG. 1), wherein the processor (e.g., the processor 120 of FIG. 1) may be configured to control the electronic device to output a test acoustic signal through the sound output device (e.g., the sound output device 155 of FIG. 2), receive the output test acoustic signal through the microphone (e.g., the input device 150 of FIG. 1), and determine whether the electronic device (e.g., the electronic device 101 of FIG. 1 or 2) is in the state where the foreign substance has entered into the electronic device based on a magnitude of the signal received through the microphone (e.g., the input device 150 of FIG. 1) being less than a specified reference value.

According to various example embodiments, the processor (e.g., the processor 120 of FIG. 1) may control the electronic device to not output the specified acoustic signal based at least on determining that the electronic device (e.g., the electronic device 101 of FIG. 1 or 2) is directed in a different direction.

According to various example embodiments, the electronic device (e.g., the electronic device 101 of FIG. 1 or 2) may further include a display (the display device 160 of FIG. 1 or 2), wherein the processor (e.g., the processor 120 of FIG. 1) may control the electronic device to output a user notification for inducing a change in the direction of the electronic device (e.g., the electronic device 101 of FIG. 1 or 2) through the display (the display device 160 of FIG. 1 or 2) based at least on determination that the electronic device (e.g., the electronic device 101 of FIG. 1 or 2) is directed in a different direction.

According to various example embodiments, the processor (e.g., the processor 120 of FIG. 1) may be configured to control the electronic device to output the specified acoustic signal for a first time period, and output another specified acoustic signal having another specified frequency band and another specified waveform for a second time period after the first time period. The processor (e.g., the processor 120 of FIG. 1) may control a maximum intensity of the another specified acoustic signal to be less than a maximum intensity of the specified acoustic signal.

According to various example embodiments, the electronic device (e.g., the electronic device 101 of FIG. 1 or 2) may further include a display (e.g., the display device 160 of FIG. 1 or 2), wherein the processor (e.g., the processor 120 of FIG. 1) may control the electronic device to output a user interface associated with discharging of the foreign substance through the display (e.g., the display device 160 of FIG. 1 or 2), and determine that the electronic device (e.g., the electronic device 101 of FIG. 1 or 2) is in the state where the foreign substance has entered into the electronic device based at least on a user input received through the user interface.

According to various example embodiments, the processor (e.g., the processor 120 of FIG. 1) may be configured to determine location information of the electronic device (e.g., the electronic device 101 of FIG. 1 or 2) based at least on information collected through the sensor module (e.g., the sensor module 176 of FIG. 1), and to control the electronic device to output the specified acoustic signal based at least on the location information.

According to various example embodiments, the processor (e.g., the processor 120 of FIG. 1) may be configured to receive weather information from an external server (e.g., the server 108 of FIG. 1), and to control the electronic device to output the specified acoustic signal based at least on the weather information.

According to various example embodiments, the processor (e.g., the processor 120 of FIG. 1) may be configured to receive time information from an external server (e.g., the server 108 of FIG. 1), and to control the electronic device to output the specified acoustic signal based at least on the time information.

According to various example embodiments, the electronic device (e.g., the electronic device 101 of FIG. 1 or 2) may further include a vibration element including vibration circuitry mounted inside the housing and configured to generate vibration, wherein the processor (e.g., the processor 120 of FIG. 1) may be configured to control the vibration element to vibrate in a specified pattern while the first acoustic signal is output. The processor (e.g., the processor 120 of FIG. 1) may be configured to control the vibration element to vibrate in the pattern associated with the specified frequency band.

According to various example embodiments, the processor (e.g., the processor 120 of FIG. 1) may be configured to control the electronic device to output the specified acoustic signal to have at least one waveform of a pulse wave, a square wave, and a sawtooth wave using the sound output device (e.g., the sound output device 155 of FIG. 2).

According to various example embodiments, the processor (e.g., the processor 120 of FIG. 1) may be configured to control the electronic device to output the specified acoustic signal such that a maximum intensity of the specified waveform corresponds to a maximum output of the sound output device (e.g., the sound output device 155 of FIG. 2).

According to various example embodiments, the sound output device (e.g., the sound output device 155 of FIG. 2) may be at least one of a speaker and a receiver for a call.

A method for outputting sound according to various example embodiments may include determining, by an electronic device (e.g., the electronic device 101 of FIG. 1 or 2), whether the electronic device (e.g., the electronic device 101 of FIG. 1 or 2) is in a state where a foreign substance has entered into the electronic device through an opening (e.g., the opening 260 of FIG. 2) for the sound output of the electronic device (e.g., the electronic device 101 of FIG. 1 or 2), determining whether the opening (e.g., the opening 260 of FIG. 2) of the electronic device (e.g., the electronic device 101 of FIG. 1 or 2) is directed in a specified direction using a sensor module (e.g., the sensor module 176 of FIG. 1) of the electronic device (e.g., the electronic device 101 of FIG. 1 or 2) based at least on determining that the electronic device (e.g., the electronic device 101 of FIG. 1 or 2) is in the state where the foreign substance has entered into the electronic device, and outputting a specified acoustic signal having a specified frequency band and a specified waveform through a sound output device (e.g., the sound output device 155 of FIG. 2) of the electronic device (e.g., the electronic device 101 of FIG. 1 or 2) based at least on determining that the electronic device (e.g., the electronic device 101 of FIG. 1 or 2) is directed in the specific direction.

According to various example embodiments, the determining of whether the electronic device (e.g., the electronic device 101 of FIG. 1 or 2) is in the state where the foreign substance has entered into the electronic device may include: outputting a test acoustic signal through the sound output device (e.g., the sound output device 155 of FIG. 2), receiving the output test acoustic signal through a microphone (e.g., the input device 150 of FIG. 1) of the electronic device (e.g., the electronic device 101 of FIG. 1 or 2), and determining that the electronic device (e.g., the electronic device 101 of FIG. 1 or 2) is in the state where the foreign substance has entered into the electronic device based on a magnitude of the signal received through the microphone (e.g., the input device 150 of FIG. 1) being less than a specified reference value.

According to various example embodiments, the method for outputting the sound may further include not outputting the specified acoustic signal based at least on determining that the electronic device (e.g., the electronic device 101 of FIG. 1 or 2) is directed in a different direction.

According to various example embodiments, the method for outputting the sound may further include outputting another specified acoustic signal having another specified frequency band and another specified waveform after a specified time period.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The electronic device according to various example embodiments of the disclosure outputs the acoustic signal of the low frequency having the specific waveform to effectively discharge the foreign substance (e.g., the soil, the dust, the sand, and the moisture), or to separate the foreign substance (e.g., the soil, the dust, the sand, and the moisture) from the mesh net.

The electronic device according to various example embodiments of the disclosure may use the speaker (or the receiver) and the vibration motor to effectively discharge the foreign substance (e.g., the soil, the dust, the sand, and the moisture) or to separate the foreign substance (e.g., the soil, the dust, the sand, and the moisture) from the mesh net.

While the disclosure has been illustrated and described with reference to various example embodiments thereof, it will be understood by those skilled in the art that various changes in form and details may be made therein without departing from the spirit and scope of the disclosure, including the appended claims and their equivalents.

What is claimed is:

1. An electronic device comprising:
a housing surrounding an exterior of the electronic device and including at least one opening;
a sensor module comprising at least one sensor configured to sense a direction of the electronic device;
a sound output device comprising sound output circuitry configured to output an acoustic signal through the at least one opening;
a memory; and
a processor electrically connected to the sensor module and the sound output device,
wherein the processor is configured to:
determine whether the electronic device is in a state where a foreign substance has entered into the electronic device through the at least one opening;
determine whether the electronic device is in a first disposition state using the sensor module based at least on determining that the electronic device is in the state where the foreign substance has entered into the electronic device; and
control the electronic device to output a specified acoustic signal having a specified frequency band and a specified waveform through the sound output device based on the electronic device being in the first disposition state.

2. The electronic device of claim 1, wherein the first disposition state includes a state in which a portion of the housing having the opening is directed in a first direction.

3. The electronic device of claim 2, wherein the first direction is a ground direction or a gravity direction.

4. The electronic device of claim 2, wherein the processor is configured to change at least one of the frequency band, the waveform, and an intensity of the acoustic signal based on an angle between the portion of the housing having the opening and the first direction.

5. The electronic device of claim 1, wherein the first disposition state includes a state where a portion of the housing having the opening is directed in a direction within a specified angle range with respect to a ground direction or a gravity direction.

6. The electronic device of claim 1, further comprising:
a microphone,
wherein the processor is configured to control the electronic device to:
output a test acoustic signal through the sound output device;
receive the output test acoustic signal through the microphone; and
determine that the electronic device is in the state where the foreign substance has entered into the electronic device based on a magnitude of the signal received through the microphone being less than a specified reference value.

7. The electronic device of claim 1, wherein the processor is configured to control the electronic device to not output the specified acoustic signal based at least on determining that the electronic device is directed in a direction different than a direction of the first disposition state.

8. The electronic device of claim 1, further comprising:
a display,
wherein the processor is configured to control the electronic device to output a user notification for inducing a change the direction of the electronic device through the display based at least on determining that the electronic device is directed in a direction different than a direction of the first disposition state.

9. The electronic device of claim 1, wherein the processor is configured to control the electronic device to:
output the specified acoustic signal for a first time period; and
output another specified acoustic signal having another specified frequency band and another specified waveform for a second time period after the first time period.

10. The electronic device of claim 9, wherein the processor is configured to control a maximum intensity of the another specified acoustic signal to be less than a maximum intensity of the specified acoustic signal.

11. The electronic device of claim 1, further comprising:
a display,
wherein the processor is configured to control the electronic device to:
output a user interface associated with discharging of the foreign substance through the display; and
determine that the electronic device is in the state where the foreign substance has entered into the electronic device based at least on a user input received through the user interface.

12. The electronic device of claim 1, wherein the processor is configured to:
determine location information of the electronic device based at least on information collected through the sensor module; and
to control the electronic device to output the specified acoustic signal based at least on the location information.

13. The electronic device of claim 1, wherein the processor is configured to:
receive weather information from an external server; and
to control the electronic device to output the specified acoustic signal based at least on the weather information.

14. The electronic device of claim 1, wherein the processor is configured to:
receive time information from an external server; and
to control the electronic device to output the specified acoustic signal based at least on the time information.

15. The electronic device of claim 1, further comprising:
a vibration element comprising a vibration motor mounted inside the housing and generating vibration,
wherein the processor is configured to control the vibration element to vibrate in a specified pattern while the first acoustic signal is output.

16. The electronic device of claim 15, wherein the processor is configured to control the vibration element to vibrate in the pattern associated with the specified frequency band.

17. The electronic device of claim 1, wherein the processor is configured to control the electronic device to output the specified acoustic signal to have at least one of a pulse wave, a square wave, and a sawtooth wave using the sound output device.

18. The electronic device of claim 1, wherein the processor is configured to output the specified acoustic signal such that a maximum intensity of the specified waveform corresponds to a maximum output of the sound output device.

19. The electronic device of claim 1, wherein the sound output device includes at least one of a speaker and a receiver for a call.

20. A method for outputting sound performed in an electronic device, the method comprising:
determining whether the electronic device is in a state where a foreign substance has entered into the electronic device through an opening for outputting the sound of the electronic device;

determining whether the opening of the electronic device is directed in a specified direction within a specified angle range with respect to a first direction using a sensor module of the electronic device based at least on determining that the electronic device is in the state where the foreign substance has entered into the electronic device; and outputting a specified acoustic signal having a specified frequency band and a specified waveform through a sound output device of the electronic device while the opening is directed in the specified direction.

* * * * *